United States Patent [19]

Das et al.

[11] Patent Number: 5,286,314
[45] Date of Patent: * Feb. 15, 1994

[54] RAPIDLY SOLIDIFIED ALUMINUM-GERMANIUM BASE BRAZING ALLOYS

[75] Inventors: Santosh K. Das, Randolph; Chin-Fong Chang, Morris Plains, both of N.J.

[73] Assignee: AlliedSignal Inc., Morris Township, Morris County, N.J.

[*] Notice: The portion of the term of this patent subsequent to Oct. 27, 2009 has been disclaimed.

[21] Appl. No.: 917,650

[22] Filed: Jul. 23, 1992

Related U.S. Application Data

[63] Continuation of Ser. No. 692,852, Apr. 29, 1991, Pat. No. 5,158,621.

[51] Int. Cl.$^5$ .............................................. C21D 1/00
[52] U.S. Cl. ................................... 148/528; 148/535; 148/437; 148/442; 228/221; 228/262.5; 420/528; 420/556; 420/580
[58] Field of Search ............. 148/437, 442, 528, 535; 420/528, 556, 580; 228/221, 263.17

[56] References Cited

U.S. PATENT DOCUMENTS

| | | | |
|---|---|---|---|
| 2,659,138 | 11/1953 | Stroup | 420/548 |
| 2,963,780 | 12/1960 | Lyle et al. | 420/550 |
| 2,967,351 | 1/1961 | Roberts et al. | 75/249 |
| 3,462,248 | 8/1969 | Roberts et al. | 420/528 |
| 3,791,820 | 2/1974 | Werner | 420/548 |
| 4,142,571 | 3/1979 | Narasimhan | 164/88 |
| 4,347,076 | 8/1982 | Ray et al. | 420/550 |
| 4,379,719 | 4/1983 | Hildeman et al. | 420/550 |
| 4,647,321 | 3/1987 | Adam | 148/415 |
| 4,729,790 | 3/1988 | Skinner | 420/548 |
| 4,869,751 | 9/1989 | Zedalis et al. | 419/67 |
| 4,878,967 | 11/1989 | Adam et al. | 148/437 |
| 4,929,511 | 5/1990 | Bye et al. | 428/606 |
| 5,158,621 | 10/1992 | Das et al. | 420/528 |

FOREIGN PATENT DOCUMENTS

| | | |
|---|---|---|
| 0145933 | 6/1985 | European Pat. Off. . |
| 0218035 | 4/1987 | European Pat. Off. . |
| 228196 | 10/1985 | German Democratic Rep. . |
| 61-245993 | 11/1986 | Japan .................. 420/528 |
| 766368 | 1/1957 | United Kingdom . |

OTHER PUBLICATIONS

Bendijk et al., "Characterization of Al-Si Alloys rapidly quenched from the melt", J. Mat. Science, 15, (1980), pp. 2803-2810.

Delhez et al., "Structural inhomogeneities of AlSi alloys rapidly quenched from the melt", J. Mat. Science, 17, (1982), pp. 2887-2894.

Armstrong et al., "Effect of decreased section thickness on the formation, structure, and properties of a chill-cast aluminum-silicon alloy," The Metal Society, London (1979) pp. 454-459.

Primary Examiner—Melvyn J. Andrews
Assistant Examiner—Robert R. Koehler
Attorney, Agent, or Firm—Ernest D. Buff; Gerhard H. Fuchs

[57] ABSTRACT

A low melting (liquidus temperature <570° C.) rapidly solidified brazing alloy consists essentially of about 14 to 52 weight percent germanium, 0 to 10 weight percent of at least one element selected from the group consisting of silicon, magnesium, bismuth, strontium, lithium, copper, calcium, zinc and tin, the balance being aluminum and incidental impurities. The alloy has the form of a foil and can be used to braze non-heat-treatable rapidly solidified Al-Fe-Si-V alloy foil, sheet plate and tubing to components such as deicing duct, overduct, radiator, heat exchanger, evaporator, honeycomb panel for elevated temperature applications.

1 Claim, 7 Drawing Sheets

RAPIDLY SOLIDIFIED ALUMINUM-GERMANIUM BASE BRAZING ALLOYS

This application is a continuation of application Ser. No. 692,852, filed Apr. 29, 1991, now U.S. Pat. 5,158,621.

FIELD OF THE INVENTION

This invention relates to low melting aluminum-germanium base brazing alloys, as well as to a method for brazing aluminum-germanium base metal articles, and for heating treating the brazement to achieve a better joint strength.

DESCRIPTION OF THE PRIOR ART

Aluminum alloys can be joined by a wide variety of methods, including fusion and resistance welding, brazing and soldering, adhesive bonding and mechanical bonding, and mechanical methods such as riveting and bolting. When proper techniques are used, joints have more than adequate strength for the many demanding applications of aluminum alloy.

Brazing is a process in which coalescence, joining, or uniting of an assembly of two or more parts into one structure is achieved by heating the base metal to a temperature below its solidus temperature and adding a filler alloy, with or without flux. The major requirement of brazing is to adjust conditions so that gravity and capillarity cause molten brazing filler metal to flow through the full length of the joint and form fillets. The flux promotes wetting of the joint surface by the filler alloy, which is selected to have a liquidus temperature slightly below the solidus temperature of the base metal. The molten filler metal reacts with the parts to be joined so that when cooled a strong joint is formed. Although the base metal is not melted, there is definite diffusion between the base and filler metals. Commercially available aluminum-base filler metals used for brazing aluminum alloys have liquidus temperatures much closer to the solidus temperature of the base metal than do those for brazing most other metals.

Filler metals used are commonly in wire, ring, shim, clad sheet, powder, foil, paste, or slurry form depending on the alloy composition, the specific application and process. The filler metals are often used in conjunction with fluxes and the process may be carried out in inert atmosphere or vacuum. The foil form of filler metal provides the advantage of preplacing a controlled amount of filler metal in the joint area, thus permitting brazing of complex shapes with minimum rejection.

Filler metals are alloys based on binary or ternary eutectic systems and are designed to have a good capillarity at the joining temperatures, and characteristic suitable to meet specific environmental conditions. Filler metals for brazing of aluminum and aluminum alloys are aluminum-silicon alloys containing 7 to 12 wt % silicon and are designated AWS BAlSi. Liquidus, solidus and brazing temperatures of these alloys decrease with increasing silicon content up to about 12.5 wt %. It has been proposed that these alloys contain up to 3 wt % Mg for fluxless furnace brazing. The manufacture of filler metal in sheet (thin gage shim stock) becomes more difficult as the silicon content increases. Only filler metals BAlSi-2 (AA 4343: Al- 7.5 wt % Si), BAlSi-3 (AA 4145: Al- 10 wt % Si- 4 wt % Cu), BAlSi-4 (AA 4047: Al- 12 wt % Si), BAlSi-5 (AA 4045: Al- 10 wt % Si), BAlSi-6 (Al- 7.5 wt % Si- 2.5 wt % Mg), BAlSi-7 (Al- 10 wt % Si- 1.5 wt % Mg), BAlSi-8 (Al- 12 wt % Si- 1.5 wt % Mg) are available as sheet. The nominal brazing temperatures for these filler metals range from 571° to 621° C. (1060° to 1150° F.).

Rapid solidification processing (RSP) affects microstructural refinement in many alloy systems, which provide such systems with distinct advantages over conventionally processed alloys. The high cooling rates ($\sim 10^5$ -$10^{7°}$ C./sec) obtained with RSP can produce extended solid solubility, metastable phases, fine intermetallic dispersoids and reduced compositional segregation; all of which contribute to improved mechanical properties. Rapidly solidified materials, typically cast to foil form for direct use in metal joining, offer superior purity and chemical and microstructural homogeneity when compared with conventionally formed brazing filler metals. This homogeneity, in turn, manifests itself in uniform melting, flow in the joint area and solidification during the brazing process. Accurate control of brazing in this manner, which permits the production of uniform joint microstructures, free of voids and macroscopic segregation, results in a dramatic reduction of rejection rate and superior joint properties. Over a broad range of base metal/filler metal combinations, the use of RS filler metals yield joints with superior mechanical properties and improved resistance to thermal fatigue and corrosion. Moreover, the use of RS technology uniquely permits the formation of foils in many filler-metal systems which are brittle and unformable in the crystalline state.

Rapidly quenched binary aluminum-silicon alloy containing about 12.5 atomic percent silicon are disclosed by Bendijk et al., *Journal of Materials Science*, 15, (1980), pp. 2803-2810 and Delhez et al., *Journal of Materials Science*, 17, (1982), pp. 2887-2894. Armstrong et al., *Solidification Metals*, The Metals Society, London, (1979), pp. 454-459, likewise disclosed structure and properties of rapidly solidified aluminum - 10.5 weight percent silicon. Bye et. al., *Low Temperature Aluminum Based Brazing Alloys*, U.S. Pat. No. 4,929,511, May 1990, disclosed rapidly solidified aluminum alloy consisting essentially of about 10 to 13 weight percent Si, 0 to 3 weight percent Mg, 0 to 4 weight percent Cu, 0 to 0.2 weight percent of at least one of Bi, P, Sr, Li, Sc, Y, Ca, and 0 to 2 weight percent of at least one of rare earth elements, the balance being aluminum and incidental impurities, which has liquidus temperature $>570°$ C.

U.S. Pat. No. 4,142,571 to Narasimhan teaches a method for making continuous polycrystalline or amorphous strips of considerable width (greater than 7 mm) directly from the melt by forcing molten metal onto the surface of a moving chill body under pressure through a slotted nozzle located in close proximity to the surface of the chill body. However, because of the density, fluidity, and strong tendency for oxidation of aluminum alloys, it has been found that it is very difficult to maintain melt flow uniformity for long times and therefore produce large quantities of aluminum alloy ribbon suitable for brazing applications. U.S. Pat. No. 4,929,511 to Bye et al. teaches a method by adapting a scraping mechanism located upstream of the nozzle to ride on the substrate and remove therefrom the gaseous boundary layer associated therewith. Disposed between the scraping mechanism and the nozzle is a gas supply mechanism adapted to introduce a replacement gas that is carried by the substrate to the nozzle. A shielding means configured to form a semi-enclosed chamber around the nozzle and the substrate apparatus to direct and confine the replacement gas in the vicinity of the nozzle.

An alternative to filler metal foil is known as brazing sheet. Brazing sheet consists of a brazable aluminum alloy roll bonded or clad on one or both sides with a brazing alloy of the desired composition. The limitations in the use of brazing sheet include the increased costs involved in the manufacturing. Additionally, there is a minimum thickness of approximately 0.6 mm for each sheet. The relatively thick sheets, in turn, result in silicon diffusion into the core, which limits the amount of filler metal available for joint formation.

Rapid solidification/powder metallurgy (RS/PM) of aluminum-base alloys for elevated temperature applications have been disclosed in U.S. Pat No. 2,963,780 to Lyle, et al.; U.S. Pat. No. 2,967,351 to Roberts, et al., U.S. Pat. No. 3,462,248 to Roberts et al., U.S. Pat. No. 4,379,719 to Hildeman, et al., U.S. Pat. No. 4,347,076 to Ray, et al., U.S. Pat. No. 4,647,321 to Adam, et al., and U.S. Pat. No. 4,729,790 to Skinner, et al. The alloys taught by Lyle, et al., Roberts, et al. and Hildeman, et al. were produced by atomizing liquid metals into finely divided droplets by high velocity gas streams. The droplets were cooled by convective cooling at a rate of approximately $10^{4°}$ C./sec. Alternatively, the alloys taught by Adam, et al., Ray, et al. and Skinner et al. were produced by ejecting and solidifying a liquid metal stream onto a rapidly moving substrate. The produced ribbon is cooled by conductive cooling at rates in the range of $10^{5°}$ to $10^{7°}$ C./sec. and mechanically comminuted to powders. Engineering alloys containing substantially higher quantities of transition elements are able to be produced by rapid solidification with mechanical properties superior to those previously produced by conventional solidification processes. However, these alloys are non-heat-treatable.

To achieve the advantages afforded by rapid solidification processing, the powders must be fabricated into a final shape by a series of steps including degassing, compaction, consolidation and forming. Sheet or plate is fabricated by extrusion or forging, followed by machining prior to rolling. U.S. Pat. No. 4,869,751 to Zedalis et al. taught a method of producing a rolled product composed of a dispersion strengthened, non-heat treatable, aluminum-base alloys (for example: AA 8009 Al-Fe-V-Si alloy) disclosed in U.S. Pat. No. 4,878,967 to Adam et al. It has been found that isothermal exposure to temperatures at or below 450° C. has little deleterious affect on ambient tensile properties. At temperatures in excess of 450° C., there is a continual decrease in tensile properties. Rolling is performed in the range of about 230° C. to 500° C., preferably from about 230° C. to 330° C. Rolling performed at 300° C., is observed to have little effect on mechanical properties when compared to the mechanical properties produced by extrusion. Despite the fact that rollability may increase with temperature, the higher rolling temperatures have been found to have an adverse affect on strength. For example, rolling at 500° C. results in a 5% decrease of tensile strength.

The limiting factor of non-heat-treatable RS/PM Al-Fe-V-Si alloys with superior property to be used in commercial applications is their ability to be joined into various components. The development of brazing alloy for non-heat-treatable RS/PM Al-Fe-V-Si alloys must meet several criteria:

(a) ability to wet the base metal and form a strong, sound bond with it;

(b) suitable melting and flow characteristics to permit distribution by capillary attraction;

(c) composition of sufficient homogeneity and stability to minimize separation by liquation during brazing;

(d) ability to produce joints with needed service capabilities: service temperature, thermal cycling, strength, corrosion resistance, electrical and thermal conductivity, life expectancy, stress loading, and radiation stability;

(e) depending on the requirements, ability to produce or prevent base metal/filler metal interactions;

(f) low brazing temperatures to economize on heat energy, minimize heat effects on the base metal, minimize filler metal/base metal interactions and increase the life of fixtures and other tools.

There remains a need in the art for an aluminum-base brazing alloy with low melting temperature (liquidus temperature less than 570° C.), and which exhibits reduced surface tension and improved wetting and flow during brazing. It would be particularly desirable if such aluminum brazing alloy were available in foil form.

Summary of the Invention

The present invention provides a method for making continuous ribbons of aluminum based metal alloys having a form and composition particularly suited for use as brazing foils in fluxless brazing processes. The brazing foil of the invention is produced by a process, comprising the steps of forming a melt of the desired composition and quenching the melt on a moving chill body at a rate of at least $10^{5°}$ C./sec. That process further comprises the provision of a means to protect the melt puddle from excessive oxidation and physical disturbance by the air boundary layer carried with the moving substrate. The protection is provided by a shrouding apparatus which serves the dual purpose of containing a reducing gas, such as CO or an inert gas, around the nozzle while excluding extraneous wind currents which may disturb the melt puddle. In accordance with the process of the invention, a filler metal foil is easily fabricated as ribbon that can be used in the as-cast form. The brazing foil of the invention is homogeneous and can be placed in the joint prior to the brazing operation.

Generally stated, the brazing foil composition consists essentially of about 14 to 52 weight percent germanium, 0 to 10 weight percent of at least one element selected from the group consisting of silicon, magnesium, bismuth, strontium, lithium, copper, calcium, zinc and tin, the balance being aluminum and incidental impurities. The addition of germanium, silicon and copper depresses the melting point of the alloy, while the addition of at least about 0.5 weight percent of magnesium, reduces the surface tension, enhances wetting and promotes good filler metal flow in fluxless brazing processes. The other elements such as zinc, lithium, calcium, tin, strontium and bismuth also influence the filler metal flow and, in addition, refine the microstructure of the brazed joint, thereby improving the ductility and mechanical properties of the joint.

In addition, the invention provides a foil having a microstructure containing very fine and uniformly distributed intermetallic particles. The foil is suitable for use in brazing applications, especially fluxless brazing processes, in its as-cast state, and requires no subsequent processing (other than cutting into a desired preform shape).

Further, there is provided in accordance with the invention, an improved process for joining two or more metal parts by brazing. The process comprises the steps of:

(a) removing the oxide layer of a base metal by grinding the base metal with 600 grit SiC paper, rinsing the base metal in ethanol, drying the base metal, ultrasonically etching the base metal in the solution containing 89 v/o $H_2O$, 12.5 v/o $HNO_3$, 2.5 v/o HF for 2 to 5 mins., rinsing the base metal in ethanol, and drying the base metal;

(b) ultrasonically rinsing a filler metal in acetone for 5 mins.;

(c) interposing the filler metal, between the metal parts to form an assembly with two metal parts parallel or normal to each other;

(d) holding the assembly together using a stainless steel fixture having the capability of applying pressure up to 6.9 MPa (1 ksi) on the assembly by means of a stainless steel disk spring;

(e) heating the assembly in a vacuum of $1 \times 10^{-3}$ Torr or lower, or in a reducing atmosphere, to at least above solidus temperature of the filler metal;

(f) cooling the assembly; and (g) annealing the brazed specimen to improve the joint strength.

The filler metal and the improved brazing process as disclosed in the invention can be used to join advanced non-heat-treatable RS/PM Al-Fe-V-Si (for example: AA 8009) alloy sheets, plates, foils, or tubings into various components; such as deicing ducts, overducts, radiators, heat exchangers, evaporators, honeycomb panels, for elevated temperature application.

BRIEF DESCRIPTION OF THE DRAWINGS

The invention will be more fully understood and further advantages will become apparent when reference is made to the following detailed description and the accompanying drawings, in which:

FIG. 4 is an optical macrograph of AA 8009 (0.1 mm thick) honeycomb joined with AA 8009 faced-sheet (1.5 mm thick) by using the filler metal of the invention, (a) top view, (b) side view; and FIG. 5 is an optical micrograph of the joint shown in FIG. 4 at low (a) and high (b) magnification.

DESCRIPTION OF THE PREFERRED EMBODIMENTS

The present invention provides a method for making continuous ribbons of aluminum based metal alloys having a form and composition particularly suited for use as brazing foils in fluxless brazing processes. The brazing foil of the invention is fabricated by a process, which comprises the steps of forming a melt of the desired composition and quenching the melt on a moving chill substrate at a rate of at least $10^{5°}$ C./sec. That process further comprises the provision of a means to protect the melt puddle from excessive oxidation and physical disturbance by the air boundary layer carried with the moving substrate. Said protection is provided by a shrouding apparatus which serves the dual purpose of containing a reducing gas, or an inert gas, around the nozzle while excluding extraneous wind currents which may disturb the melt puddle. The preferred protective gas is carbon monoxide, although other gases such as helium, nitrogen or argon can be used. The advantage of using CO is that it burns, combining with oxygen present around the nozzle to produce hot $CO_2$. The process reduces the oxygen available for alloy oxidation, keeps the nozzle hot and produces a gas of lower density than air to impinge on the melt puddle. The presence of the scraper and side shields also improves the effectiveness of the CO flame. With a scraper the flame burns upstream of the nozzle and of the gas inlet tube, indicating the effectiveness of the scraper in removing the air boundary layer and, therefore, creating a low pressure area behind it which is filled by the protective gas. With both side shields used in conjunction with the scraper blade and protective gas, the gas flow pattern is uniform and consistent and ribbon can be cast reliably.

The alloys cast according to this invention are rapidly solidified ribbons which cool at a rate in excess of $10^{5°}$ C./sec. This process produces material suitable for use as brazing foil in the as-cast condition. Generally stated, the composition consists essentially of about 14 to 52 weight percent germanium, 0 to 10 weight percent of at least one element selected from the group consisting of silicon, magnesium, bismuth, strontium, lithium, copper, calcium, zinc and tin, the balance being aluminum and incidental impurities. The addition of germanium, silicon and copper depresses the melting point of the alloy, while the addition of at least about 0.5 weight percent of magnesium, reduces surface tension, enhances wetting and promotes good filler metal flow in fluxless brazing processes. The other elements, such as zinc, lithium, calcium, tin, strontium and bismuth act in the same manner as magnesium does, influencing the filler metal flow and, in addition, refine the microstructure of the brazed joint, thereby improving the ductility and mechanical properties of the joint.

In addition, the invention provides a foil with a microstructure typical of that obtained with rapid solidification rates containing very fine and uniformly distributed intermetallic particles. The foil is suitable for use in brazing applications, especially fluxless brazing processes, in its as-cast state, and requires no subsequent processing other than cutting into a desired preform shape. The filler metal foil is easily fabricated as ribbon that can be used in the as-cast form. Advantageously, the brazing foil of the invention is homogeneous and can be placed in the joint prior to the brazing operation.

Further, there is provided in accordance with the invention, an improved process for joining two or more metal parts by brazing. The process comprises the steps of:

(a) removing the oxide layer of base metal by grinding it with 600 grit SiC paper, rinsing it in ethanol, drying it, ultrasonically etching it in the solution containing 89 v/o $H_2O$, 12.5 v/o $HNO_3$, 2.5 v/o HF for 2 to 5 mins., rinsing it in ethanol, and drying it;

(b) ultrasonically rinsing a filler metal in acetone for 5 mins.;

(c) interposing the filler metal, between at least two parts of the base metal to form an assembly with said two metal parts parallel or normal to each other;

(d) holding the assembly together using a stainless steel fixture capable of applying pressure up to 6 MPa (1 ksi) on the assembly by means of a stainless steel disk spring;

(e) heating the assembly in a vacuum of $1 \times 10^{-3}$ Torr or lower, or in a reducing atmosphere, to at least above the solidus temperature of the filler metal;

(f) cooling the assembly; and (g) annealing the brazed specimens to improve the strength thereof.

The filler metal and the improved brazing process can be used to join advanced RS/PM Al-Fe-V-Si (for example: AA 8009) alloy sheets, plates, foils, or tubings into various components; such as deicing ducts, overducts, radiators, heat exchangers, evaporators, honeycomb panels, for elevated temperature application.

The following examples are presented in order to provide a more complete understanding of the invention. The specific techniques, conditions, material and reported data set forth to illustrate the invention are exemplary and should not be construed as limiting the scope of the invention.

EXAMPLE 1

An Al-Fe-V-Si (AA 8009) alloy [chemical composition (wt %): Fe- (8.4-8.9); Si- (1.7-1.9); V- (1.1-1.5); balance -aluminum plus incidental impurities] sheets (1.5 mm) was subjected to rapid solidification processing, which modified the alloy microstructure. The rapid solidification processing utilized a casting method wherein the alloy was placed into the molten state and then cooled at a quenched rate of at least about $10^{5°}$ to $10^{7°}$ C./sec. on a rapidly moving casting substrate to form a solid ribbon. This process provided means for protecting the melt puddle from burning, excessive oxidation and physical disturbances by the air boundary layer carried along with a moving casting surface. This protection was provided by a shrouding apparatus which contained a protective gas; such as a mixture of air or $CO_2$ and $SF_6$, a reducing gas, such as CO, or an inert gas; around the nozzle. In addition, the shrouding apparatus excluded extraneous wind currents which might disturb the melt puddle.

Ribbon produced by the above process was then subjected to comminution using a knife mill to reduce to coarse powder and a hammer mill to further reduce to fine powder. The comminuted powder particles had a size ranging from about −40 to 200 mesh, U.S. standard sieve size. The powders were placed in a vacuum of less than $10^{-4}$ torr ($1.33 \times 10^{-2}$ Pa.) preferably less than $10^{-5}$ torr ($1.33 \times 10^{-3}$ Pa.), and then compacted by conventional powder metallurgy techniques. The powders were then heated in a vacuum during the compacting step to a pressing temperature varying from about 300° to 500° C., which minimized the growth or coarsening of the dispersed, intermetallic phases. Alternatively, the powders were put in a can which was then evacuated, heated to between 300° C. to 500° C., and then sealed. The sealed can was heated to between 300° C. to 500° C., in ambient atmosphere and compacted. The compacted article was further consolidated by extrusion and forging to form a rolling stock. The extrusion and forging temperature range from 300° C. to 500° C. The extrusion ratio was at least 3:1 and ranged to about 20:1 and higher. The percent reduction per forging step was at least 5% and may range to about 40% and higher.

The rolling stock was then subjected to at least one rolling pass, with thickness reduction of up to 25 percent per pass, at temperatures ranging from 230° to 500° C. The mechanical properties of rolled sheets along rolling direction were evaluated at ambient temperature according to ASTM standard B-557M. Testing was performed at a strain rate of approximately $5 \times 10^{-4}$/sec. using an Instron Model 1125 tensile machine.

TABLE 1

Ambient Temperature Tensile Properties For AA 8009 Sheet/Foil Rolled at 400° C.

| Thickness mm (in) | 0.2% Y.S. MPa (ksi) | U.T.S. MPa (ksi) | Elongation (%) |
|---|---|---|---|
| 2.3 (0.090) | 406 (58.8) | 422 (61.2) | 17.1 |
| 1.6 (0.063) | 367 (53.2) | 402 (58.2) | 14.5 |
| 0.1 (0.004) | 352 (51.0) | 400 (58.0) | 12.6 |

EXAMPLES 2-36

Ribbons were cast in accordance with the procedure described above by using an over pressure of argon to force molten aluminum alloy through slotted nozzle onto a water cooled copper alloy wheel rotated to produce surface speeds of between about 900 m/min. and 1500 m/min. Ribbons with 25 mm width have thickness varying from about 25 to 85 μm thick.

The nominal compositions of the alloys based on the charge weight added to the melt are summarized in Table 2. The liquidus and solidus temperatures determined by differential thermal analysis are listed in Table 2. As shown in Table 2, alloys of this invention with high germanium contents and therefore low liquidus and solidus temperatures which is desirable in fluxless brazing processes have been cast into thin foils that can be easily handled and formed as brazing preforms.

TABLE 2

Composition, Solidus and Liquidus Temperatures of As-Cast Ribbons.

| Example | Alloy (wt %) Al | Ge | Others | | Solidus Temperature (°C.) | Liquidus Temperature (°C.) |
|---|---|---|---|---|---|---|
| 2 | 47.0 | 52.0 | 1.0Zn | | 421 | 438 |
| 3 | 48.4 | 51.6 | | | 428 | 449 |
| 4 | 47.9 | 51.6 | 0.5Sr | | 429 | 453 |
| 5 | 47.9 | 51.6 | 0.5Bi | | 427 | 450 |
| 6 | 45.9 | 51.6 | 0.5Bi | 2Mg | 425 | 455 |
| 7 | 47.0 | 51.0 | 2.0Zn | | 422 | 440 |
| 8 | 50.0 | 50.0 | | | 427 | 464 |
| 9 | 48.0 | 50.0 | 1.0Mg | 1.0Si | 430 | 464 |
| 10 | 47.0 | 50.0 | 1.0Mg | 2.0Cu | 420 | 456 |
| 11 | 48.0 | 50.0 | 2.0Mg | | 427 | 485 |
| 12 | 47.0 | 50.0 | 2.0Mg | 1.0Zn | 415 | 436 |
| 13 | 46.0 | 50.0 | 2.0Mg | 2.0Zn | 427 | 442 |
| 14 | 47.0 | 50.0 | 2.5Mg | 0.5Bi | 413 | 443 |
| 15 | 46.5 | 50.0 | 2.5Mg | 1.0Sn | 393 | 430 |
| 16 | 47.0 | 50.0 | 3.0Mg | | 421 | 439 |
| 17 | 45.0 | 50.0 | 3.0Mg | 2.0Zn | 422 | 440 |
| 18 | 46.5 | 50.0 | 3.0Mg | 0.5Bi | 421 | 438 |
| 19 | 46.0 | 50.0 | 4.0Mg | | 427 | 449 |
| 20 | 45.8 | 50.0 | 4.0Mg | 0.2Bi | 424 | 447 |
| 21 | 59.4 | 38.2 | 1.4Si | 1.0Mg | 433 | 550 |
| 22 | 59.5 | 38.0 | 1.5Si | 1.0Cu | 427 | 530 |
| 23 | 55.0 | 37.0 | 8.0Si | | 451 | 519 |
| 24 | 51.0 | 37.0 | 8.0Si | 4.0Cu | 441 | 495 |
| 25 | 61.5 | 35.8 | 2.0Si | 0.7Mg | 434 | 461 |
| 26 | 63.0 | 35.0 | 2.0Si | | 434 | 556 |
| 27 | 62.5 | 35.0 | 2.0Si | 0.5Bi | 434 | 547 |
| 28 | 59.0 | 35.0 | 2.0Si | 4.0Cu | 425 | 492 |
| 29 | 61.0 | 35.0 | 2.0Si | 2.0Mg | 436 | 537 |
| 30 | 61.0 | 35.0 | 2.0Si | 2.0Zn | 433 | 533 |
| 31 | 57.0 | 35.0 | 2.0Si | 6.0Cu | 428 | 491 |

TABLE 2-continued

Composition, Solidus and Liquidus Temperatures of As-Cast Ribbons.

| Example | Alloy (wt %) Al | Ge | Composition Others | | Solidus Temperature (°C.) | Liquidus Temperature (°C.) |
|---|---|---|---|---|---|---|
| 32 | 55.0 | 35.0 | 2.0Si | 8.0Cu | 441 | 482 |
| 33 | 62.0 | 35.0 | 2.0Si | 1.0Li | 441 | 554 |
| 34 | 62.0 | 35.0 | 2.0Si | 1.0Ca | 438 | 541 |
| 35 | 69.0 | 21.0 | 10.0Si | | 523 | 542 |
| Alloy Outside of the invention | | | | | | |
| 36 | 82.0 | 6.0 | 12.0Si | | 530 | 580 |

EXAMPLE 37

Figure 1:
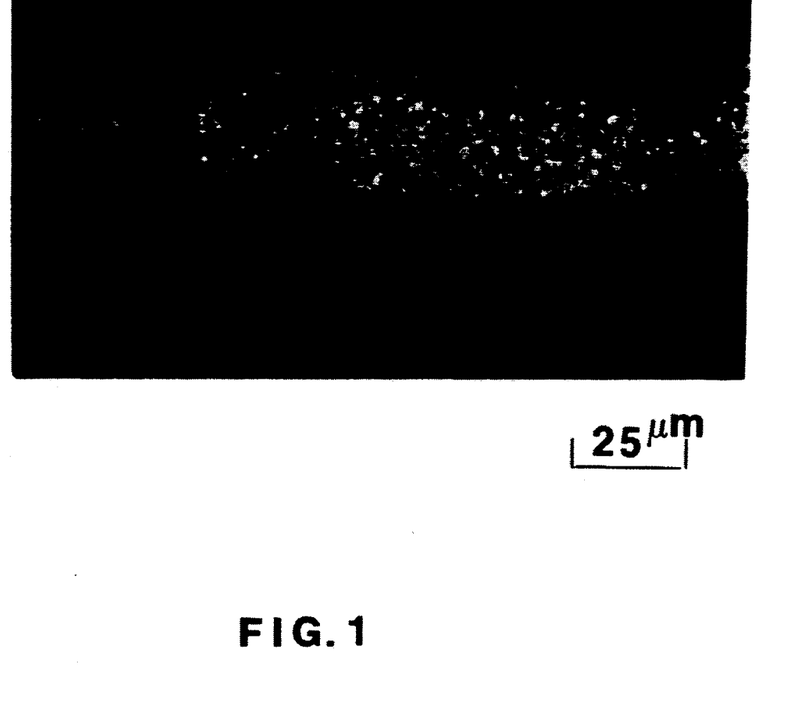
FIG. 1 is an optical micrograph of a cross section of an as-cast foil.
Figure 2:
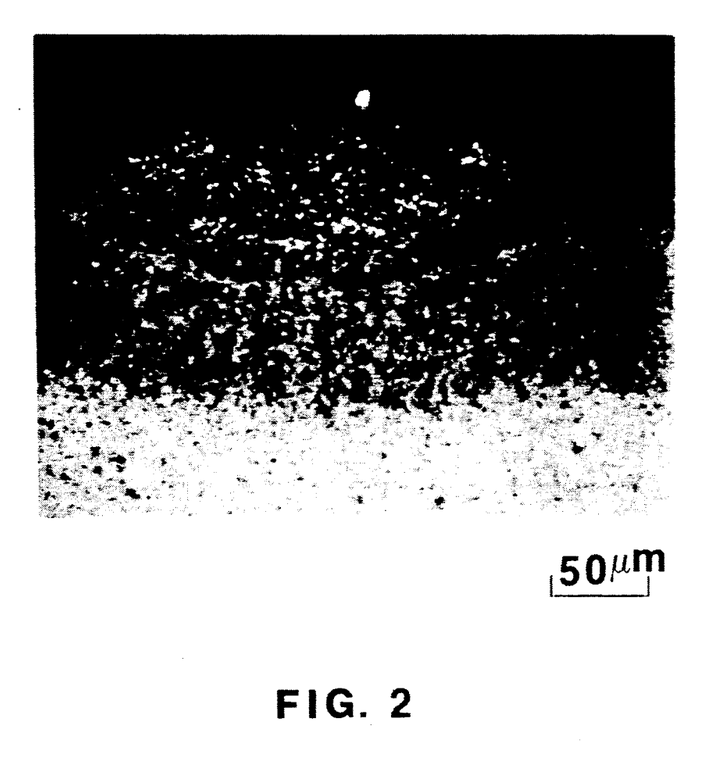
FIG. 2 is an optical micrograph of a cross section of Al- 35 wt % Ge - 2 wt % Si - 4 wt % Cu melted on top of AA 8009 sheet.

Some of the ribbon samples were cut, mounted, polished and etched using standard metallographic techniques for examination of the microstructure by optical microscopy. FIG. 1 is a micrograph of a representative sample having the composition of 59 wt % Al, 35 wt % Ge, 2 wt % Si, 4 wt % Cu. The structure is of a very fine scale typical of these alloys solidified at greater than $10^{5°}$ C./sec. To determine the wetting and flowability of these alloys on AA 8009 sheet, the melting experiment was performed. Filler metals were ultrasonically degreased in acetone for 5 minutes and dried in air. AA 8009 sheets were ground to 600 grit SiC paper, rinsed in ethanol, dried, and etched in 89 v/o $H_2O$, 10 v/o $HNO_3$, and 1 v/o HF for 10 mins., or ultrasonically etched for 2–5 mins. to remove the oxide layer prior to melting. Brazing foil (alloy 59 wt % Al, 35 wt % Ge, 2 wt % Si, 4 wt % Cu) was degreased and placed on chemically etched AA 8009 sheet as described above and melted to 450° C. for 5 mins. Sample was mounted along the cross-section and polished to examine the contact angle (theta). As wetting between crystal and substrate improves, (when theta decreases to zero), the nucleation barrier decreases, ultimately vanishing. A contact angle of 25 degree has been achieved indicating this alloy has good wetting, (FIG. 2).

EXAMPLES 38–47

Lap shear test specimens were prepared according to AWS C 3.2 "Standard Method for Evaluating the Strength of Brazed Joints". Aluminum alloy AA 8009 1.6 mm (0.060") thick produced in the example 1 was used as the base metal. Ribbons of selected compositions having dimensions of about 25 μm to 85 μm thick and about 25.4 mm (1") or 6.3 mm (0.25") wide were used as the filler metal. Brazed joints were of the lap type with overlap length of 15.2 mm (0.6"), width of 25.4 mm (1"). Prior to brazing, oxide layer on AA 8009 sheet was cleaned by grinding the sample to 600 grit SiC paper, rinsing the sample in ethanol, drying the sample, ultrasonically etching the sample in the solution containing 89 v/o $H_2O$, 12.5 v/o $HNO_3$, 2.5 v/o HF for 2 to 5 mins., rinsing the sample in ethanol, and drying the sample. The filler metal was ultrasonically rinsed in acetone for 5 minutes. Lap joints containing selected brazing ribbons of the invention were then assembled by laying out pieces of ribbon over the length of the lap joint. The assemblies were held together by using a stainless steel fixture with the capability of applying pressure up to 6.9 MPa (1 ksi) on the joints by means of stainless steel disk spring, and heated in a vacuum of $1 \times 10^{-3}$ Torr or lower or in a reducing atmosphere to at least above the solidus temperature of the filler metal. The assemblies were then cooled in furnace.

The alloy compositions of the brazing foil, brazing temperature and time, and mechanical properties of brazed joints having an overlap of 15.2 mm (0.6") are listed in Table 3. All brazing was done in a vacuum of $6 \times 10^{-6}$ Torr or better. The good flowability exhibited by the filler metal of the invention permitted brazing temperatures below 570° C. for short times. A strong joint between the filler metal and base metal was produced in each brazement.

For example, shear strengths of 15.9 MPa(2.3 ksi), and 14.5 MPa(2.1 ksi) and tensile strengths of 165.6 MPa (24 ksi) and 131.1 MPa (19.0 ksi) have been achieved in AA 8009 sheet brazed with Al-35Ge-2Si-2Zn and Al-35 Ge-2Si-4Cu ribbons.

TABLE 3

Composition, Brazing Temperature and Time and Mechanical Properties of the Brazed Joints Using Rapidly Solidified AA 8009 Al—Fe—V—Si As Base Metal.

| Ex. | Alloy (wt %) | | Composition | | Brazing Condition (°C., mins) | Shear Strength MPa (ksi) | Tensile Strength MPa (ksi) |
|---|---|---|---|---|---|---|---|
| 38 | 55.0 | 37.0 | 8.0Si | | (440, 5) | 9.7 (1.4) | 84.9 (12.3) |
| 39 | 61.0 | 35.0 | 2.0Si | 2.0Zn | (441, 1) | 15.9 (2.3) | 165.6 (24.0) |
| 40 | 59.0 | 35.0 | 2.0Si | 4.0Cu | (458, 1) | 14.5 (2.1) | 131.1 (19.0) |
| 41 | 57.0 | 35.0 | 2.0Si | 6.0Cu | (475, 1) | 11.0 (1.6) | 127.7 (18.5) |
| 42 | 57.0 | 35.0 | 2.0Si | 6.0Cu | (450, 5) | 9.0 (1.3) | 80.7 (11.7) |
| 43 | 61.0 | 35.0 | 2.0Si | 2.0Mg | (441, 1) | 10.4 (1.5) | 93.8 (13.6) |
| 44 | 62.0 | 35.0 | 2.0Si | 1.0Ca | (515, 1) | 9.7 (1.4) | 86.9 (12.6) |
| 45 | 51.0 | 37.0 | 8.0Si | 4.0Cu | (475, 1) | 3.5 (0.5) | 30.4 (4.4) |
| 46 | 51.0 | 37.0 | 8.0Si | 4.0Cu | (450, 10) | 7.6 (1.1) | 69.0 (10.0) |
| 47 | 51.0 | 37.0 | 8.0Si | 4.0Cu | (480, 5) | 7.6 (1.1) | 66.9 (9.7) |

EXAMPLES 48–56

Lap shear test specimens were prepared according to AWS C 3.2 "Standard Method for Evaluating the Strength of Brazed Joints". Aluminum alloy AA 8009 1.6 mm (0.060") thick produced in the example 1 was used as the base metal. Ribbons of selected compositions having dimensions of about 25 μm to 85 μm thick and about 25.4 mm (1") or 6.3 mm (0.25") wide were used as the filler metal. Brazed joints were of the lap type with overlap length of 15.2 mm (0.6"), width of 25.4 mm (1"). Sample preparation and brazing process were performed according to the procedures described in Examples 38–47. The brazed specimens were then heat-treated at 380° C.–400° C. for 1 to 4 hours.

The alloy compositions of the brazing foil, annealing temperature and mechanical properties of brazed joints having an overlap of 15.2 mm (0.6") are listed in Table 4. All brazing was done in a vacuum of $6 \times 10^{-6}$ Torr or better.

The improvement of shear strength of brazed samples due to post-brazing heat treatment is evident. For example, a shear strength of 22.1 MPa(3.2 ksi) and tensile strength of 202.2 MPa (29.3 ksi) has been achieved by brazing AA 8009 sheet with Al-35Ge-2Si-2Mg ribbon and annealing at 400 C for 360 mins.

dard E865-82). It is to be noted that structural film adhesives for honeycomb sandwich panels suitable for forming bonds can only withstand long term exposures at temperatures ranging from −55° to 93° C. (−67° to 200° F.), and cannot be used for elevated temperature application. However, the alloy of the invention can be

TABLE 4

Composition, Annealing Condition and Mechanical Properties of the Brazed Joint Using Rapidly Solidified AA 8009 Al—Fe—V—Si As Base Metal

| Ex. | Alloy (wt %) | | Composition | | Annealing Condition (°C., mins) | Shear Strength MPa (ksi) | Tensile Strength MPa (ksi) |
|---|---|---|---|---|---|---|---|
| 48 | 47.0 | 50.0 | 2.5Mg | 0.5Bi | (400, 60) | 13.1 (1.9) | 99.4 (14.4) |
| 49 | 62.5 | 35.0 | 2.0Si | 0.5Bi | (400, 60) | 9.7 (1.4) | 107.0 (15.5) |
| 50 | 61.0 | 35.0 | 2.0Si | 2.0Mg | (385, 120) | 10.4 (1.5) | 115.2 (16.7) |
| 51 | 61.0 | 35.0 | 2.0Si | 2.0Mg | (400, 360) | 22.1 (3.2) | 202.2 (29.3) |
| 52 | 59.4 | 38.2 | 1.4Si | 1.0Mg | (400, 120) | 13.1 (1.9) | 118.0 (17.1) |
| 53 | 59.5 | 38.0 | 1.5Si | 1.0Cu | (400, 120) | 9.0 (1.3) | 82.8 (12.0) |
| 54 | 59.5 | 38.0 | 1.5Si | 1.0Cu | (400, 225) | 14.5 (2.1) | 138.0 (20.0) |
| 55 | 59.0 | 35.0 | 2.0Si | 4.0Cu | (400, 120) | 13.8 (2.0) | 129.7 (18.8) |
| 56 | 51.0 | 37.0 | 8.0Si | 4.0Cu | (400, 120) | 8.3 (1.2) | 75.2 (10.9) |

EXAMPLES 57–63

Lap shear test specimens were prepared according to AWS C 3.2 "Standard Method for Evaluating the Strength of Brazed Joints" and tested at temperatures ranging from 25° to 260° C. Samples were preheated at testing temperatures for 30 mins. prior to testing. Aluminum alloy AA 8009 1.6 mm (0.060") thick produced in the example 1 was used as the base metal. Ribbons of selected compositions having dimensions of about 25 μm to 85 μm thick and about 25.4 mm (1") or 6.3 mm (0.25") wide were used as the filler metal. Brazed joints were of the lap type with overlap length of 15.2 mm (0.6"), width of 25.4 mm (1"). Sample preparation and brazing processes and post brazing heat treatment were performed according to the procedures described in Examples 48–56. All brazing was done in a vacuum of 6 ×10$^{-6}$ or better.

The alloy composition of the brazing foil, testing temperature and mechanical properties of brazed joints having an overlap of 15.2 mm (0.6") are listed in Table 5. The shear strength of the brazed joints using the alloy of the invention as the filter metal are retained at testing temperatures up to 260° C. (500° F.). For comparison, also listed in Table 5 are lap-shear strength requirement for corrosion-inhibiting adhesive primer for aluminum alloys to be adhesively bonded in honeycomb shelter panels (ASTM Standard E 866-82), structural film adhesives for honeycomb sandwich panels (ASTM Stanused as filler metal for brazing component which requires long term exposures at elevated temperatures.

TABLE 5

Composition, Testing Temperature and Mechanical Properties of the Brazed Joints Using Rapidly Solidified AA 8009 Al—Fe—V—Si as Base Metal.

| Ex. | Alloy (wt %) | | Composition | | Testing Temp. (°C.) | Shear Strength MPa (ksi) | Tensile Strength MPa (ksi) |
|---|---|---|---|---|---|---|---|
| 57 | 61.0 | 35.0 | 2.0Si | 2.9Mg | 25 | 22.1 (3.2) | 202.2 (29.3) |
| 58 | 61.0 | 35.0 | 2.0Si | 2.0Mg | 25 | 10.4 (1.5) | 115.2 (16.7) |
| 59 | 61.0 | 35.0 | 2.0Si | 2.0Mg | 38 | 11.0 (1.6) | 127.7 (18.5) |
| 60 | 61.0 | 35.0 | 2.0Si | 2.0Mg | 93 | 15.2 (2.2) | 178.0 (25.8) |
| 61 | 61.0 | 35.0 | 2.0Si | 2.0Mg | 149 | 8.3 (1.2) | 98.7 (14.3) |
| 62 | 61.0 | 35.0 | 2.0Si | 2.0Mg | 204 | 13.1 (1.9) | 148.4 (21.5) |
| 63 | 61.0 | 35.0 | 2.0Si | 2.0Mg | 260 | 10.4 (1.5) | 115.2 (16.7) |
| Physical Properties of adhesively bonded specimens | | | | | | | |
| adhesive primer | | | | | 25 | 20.0 (2.9) | |
| adhesive primer | | | | | 60 | 20.0 (2.9) | |
| adhesive primer | | | | | 93 | 13.0 (1.9) | |

EXAMPLE 64

Figure 3:
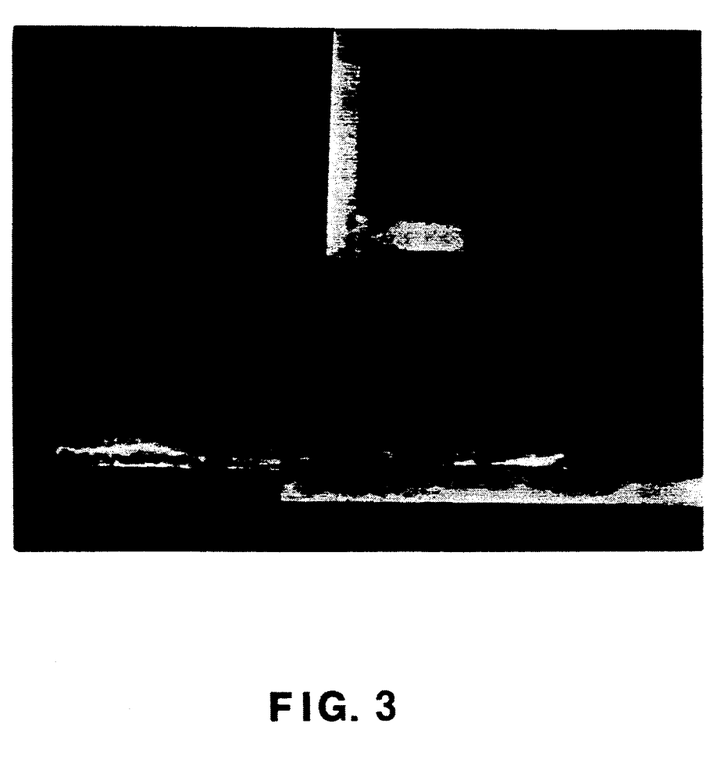
FIG. 3 is an optical macrograph of two AA 8009 (1.5 mm thick) sheets joined parallel or normal to each other by using the filler metal of the invention.
Figure 4A:
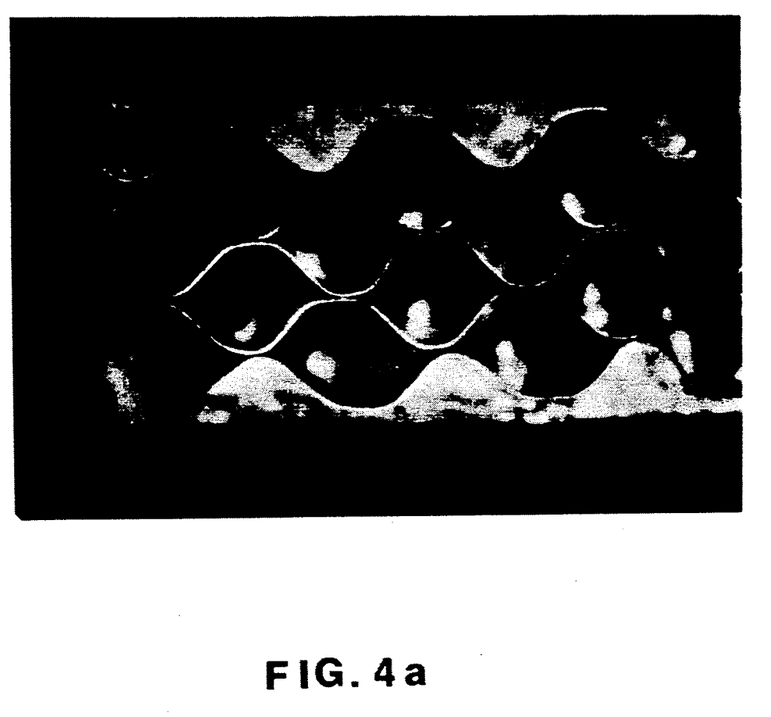
Figure 4B:
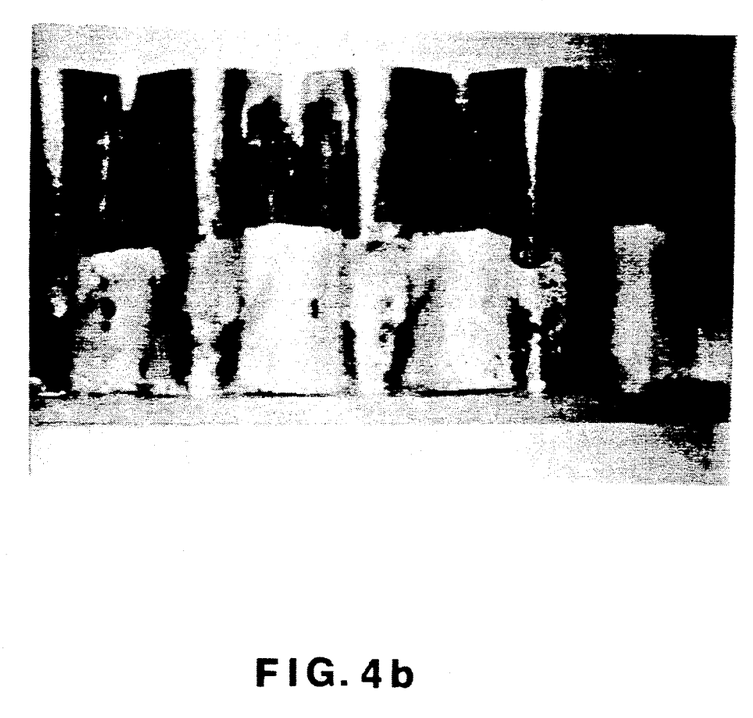
Figure 5A:
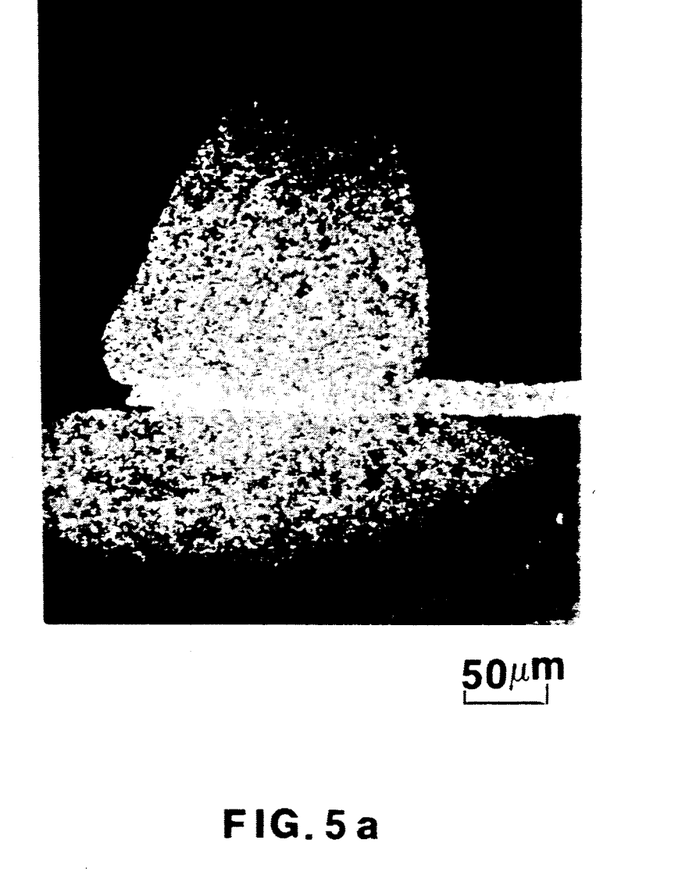
Figure 5B:
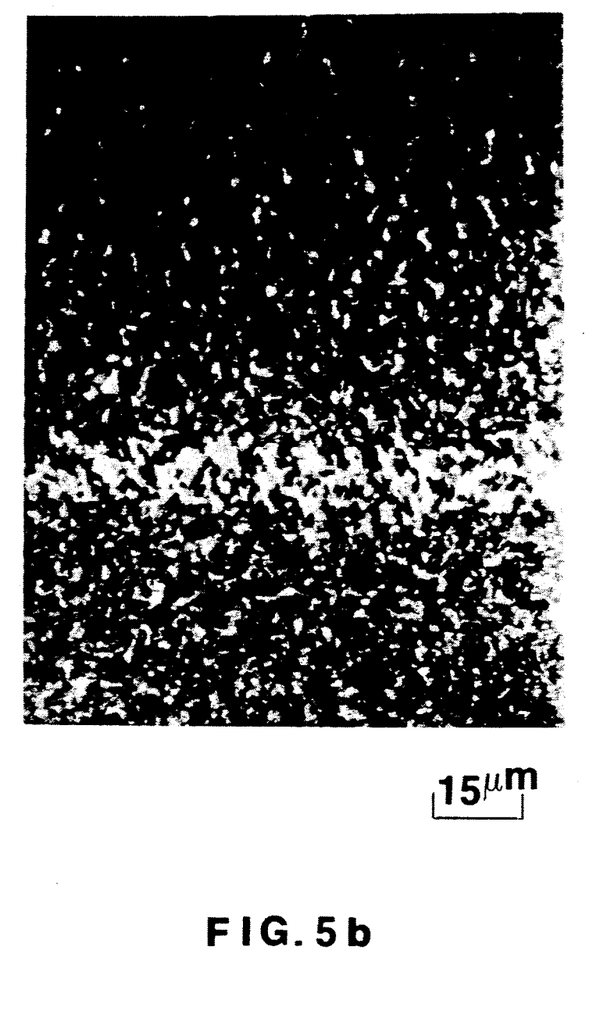

The filler metal and the improved brazing process were used to join non-heat-treatable RS/PM Al-Fe-V-Si for example: AA 8009) alloy sheets (1.5 mm thick), normal to or parallel to each other, (FIG. 3), and honeycomb, made from AA 8009 foils (0.1 mm thick), to faced sheet (1.5 mm thick) to simulate component brazing, (FIG. 4). Optical microstructure of the cross section of brazed component indicates good bonding between filler metal, honeycomb foil and faced sheet, (FIG. 5). The refine grain structure of filler metal, and base metal is due to the rapid solidification processing of low melting filler metal and base metal and the improved brazing process. Common brazing defects such as lack of fill, voids, porosity, cracks are absent.

The filler metal and the improved brazing process disclosed in the invention can be used to join non-heat-treatable RS/PM Al-Fe-V-Si (for example: AA 8009) alloy sheets, plates, foils, or tubings into various components; such as: deicing ducts, overducts, radiators, heat exchangers, evaporators, honeycomb panels, for elevated temperature application.

Having thus described the invention, in rather full detail, it will be understood that such detail need not be strictly adhered to but that obvious changes and modifications may suggest themselves to one skilled in the art.

What is claimed is:

1. A brazed metal article having a plurality of base metal parts, said article having been brazed by a process comprising the steps of:
   (a) interposing a filter metal between at least two of said base metal parts to form an assembly, said filler metal consisting essentially of a rapidly solidified brazing foil having a composition consisting essentially of about 14 to 52 weight percent germanium, 0 to 10 weight percent of at least one element selected from the group consisting of silicon, magnesium, bismuth, strontium, lithium, copper, calcium, zinc and tin, the balance being aluminum and incidental impurities;
   (b) holding the assembly together using a fixture capable of applying pressure up to 6.9 MPa (1 Ksi) thereon;
   (c) heating the assembly to at least above the solidus temperature of the filler metal;
   (d) cooling the assembly; and
   (e) annealing the assembly to improve the joint strength thereof.

* * * * *